(12) United States Patent
Morrison et al.

(10) Patent No.: US 12,330,054 B2
(45) Date of Patent: Jun. 17, 2025

(54) DIRECTIONAL PADS COMPRISING A SUSPENSION SYSTEM AND CONTROLLERS INCLUDING THE SAME

(71) Applicant: Dell Products L.P., Round Rock, TX (US)

(72) Inventors: Jason Scott Morrison, Chadron, NE (US); Yi-Ming Chou, Taipei (TW)

(73) Assignee: Dell Products L.P., Round Rock, TX (US)

( * ) Notice: Subject to any disclaimer, the term of this patent is extended or adjusted under 35 U.S.C. 154(b) by 307 days.

(21) Appl. No.: 18/150,779

(22) Filed: Jan. 5, 2023

(65) Prior Publication Data

US 2024/0226726 A1 Jul. 11, 2024

(51) Int. Cl.
*A63F 13/285* (2014.01)
*A63F 13/2145* (2014.01)
*A63F 13/24* (2014.01)

(52) U.S. Cl.
CPC ........ *A63F 13/285* (2014.09); *A63F 13/2145* (2014.09); *A63F 13/24* (2014.09)

(58) Field of Classification Search
CPC ..... A63F 13/285; A63F 13/2145; A63F 13/24
See application file for complete search history.

(56) References Cited

U.S. PATENT DOCUMENTS 9,411,420 B2 * 8/2016 Shahoian ................ G06F 3/016

* cited by examiner

*Primary Examiner* — Yingchuan Zhang
(74) *Attorney, Agent, or Firm* — Norton Rose Fulbright US LLP

(57) ABSTRACT

A directional pad for a controller can comprise a shell, a suspension system, and a haptic actuator. The shell can include a top that has opposing upper and lower surfaces. The suspension system can be coupled to the shell and include three or more elastic arms. Each of the arms can extend between a first end that is coupled to the shell and a second end that is disposed lower than the shell and the first end of the arm. The haptic actuator can be configured to vibrate the shell.

20 Claims, 15 Drawing Sheets

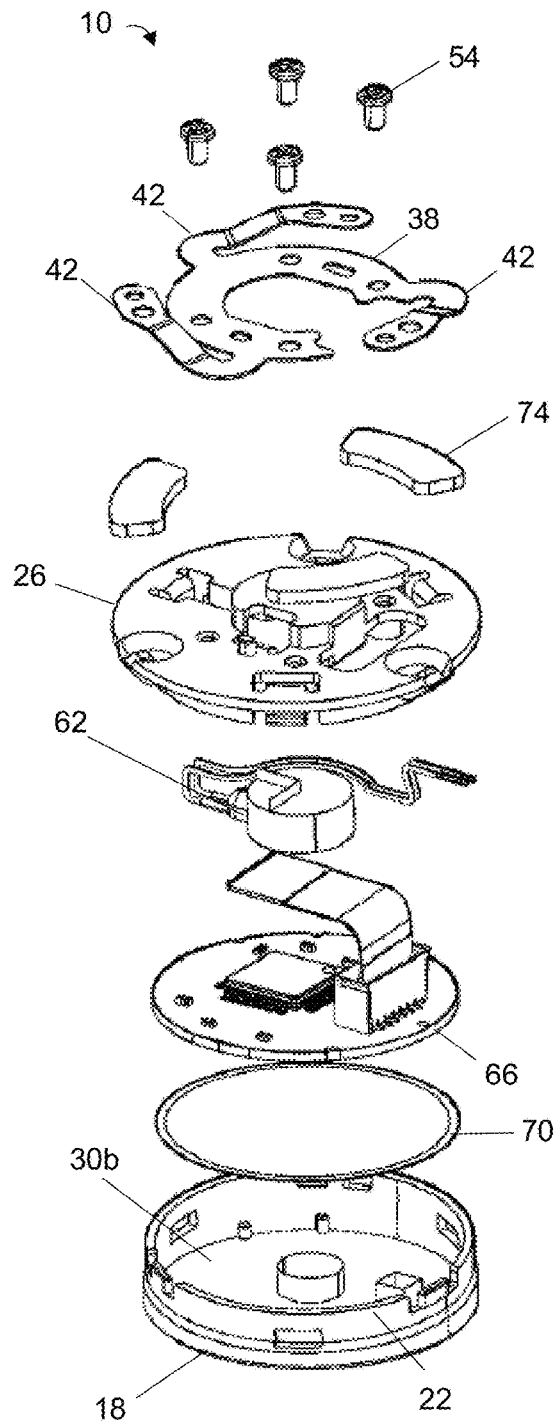
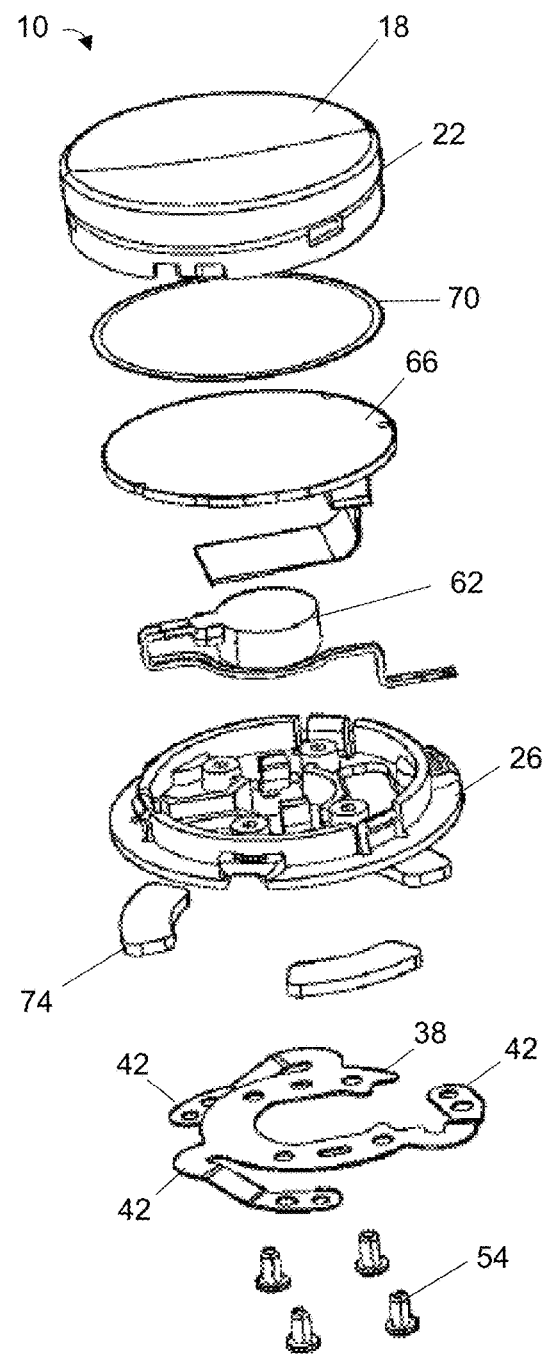
FIG. 1H
FIG. 1I

DIRECTIONAL PADS COMPRISING A SUSPENSION SYSTEM AND CONTROLLERS INCLUDING THE SAME

FIELD OF INVENTION

The present invention relates generally to directional pads for use on a controller and, more specifically, to directional pads that employ a touch sensor.

BACKGROUND

Users commonly employ controllers to issue commands that cause actions to occur in a variety of applications, such as in software applications like gaming applications. For example, a controller may be in communication with an information handling system (e.g., a personal computer or a gaming console) that is running a gaming application, and user inputs into the controller may be translated into commands that cause in-game actions like character movement, menu selections, and/or the like.

Handheld controllers may offer better mobility than other user interfaces like a keyboard and mouse, but the constrained form factor of a handheld controller may impose limitations on its performance. For example, handheld controllers may not have as many user-inputs (e.g., buttons, thumbsticks, and/or the like) as other user interfaces like a keyboard and mouse, which may in turn limit the amount of commands that can be readily issued using the handheld controller. To illustrate, handheld controllers often include a directional pad that only allows for four directional inputs (e.g., up, down, left, and right), which limits the extent to which the directional pad can be used to cause movement, scroll through options in a software application, and/or the like. While additional buttons can provide more user inputs, doing so in a handheld controller with a small form factor can result in confusion and lead a user to make incorrect input selections when the controller is used.

Additionally, user interfaces sometimes include haptic actuators to provide haptic feedback (e.g., a vibration) to a user when the user interacts with the interface, thereby signaling to the user that, for example, an input has been registered. Implementing haptic-feedback mechanisms in handheld controllers can be challenging. With the small form factor of handheld controllers, a haptic vibration directed to a particular user-input may undesirably also be transmitted to the remainder of the controller, which decreases the effectiveness of the haptic vibration. While damping mechanisms may mitigate the transmission of haptic vibrations to the remainder of the controller, they can also absorb vibrational energy at the touch surface to reduce the effectiveness of the haptic vibration.

SUMMARY

Some of the present directional pads can be used to make inputs on a controller and can comprise a shell, a haptic actuator, and a suspension system that is coupled to the shell. The haptic actuator can be configured to vibrate the shell (e.g., when an input is made on the directional pad) to provide haptic feedback to a user signaling that the user successfully made the input. For example, the vibration from the haptic actuator can simulate the feel of a button press that may be lacking in a user-input mechanism like a touch sensor that the directional pad may employ. The suspension system can enhance the haptic feedback that the haptic actuator provides. To do so, the suspension system can comprise three or more elastic arms that each extend from a first end that is coupled to the shell and a second end that can be coupled to a body of the controller and disposed lower than the shell and the first end of the arm. The arms can thus mitigate the transmission of vibrations from the haptic actuator to the controller body with minimal damping of the vibrations imparted on the directional pad's shell. Additionally, pressing on the upper surface of the directional pad's upper surface can compress the arms to allow downward movement of the shell relative to the controller from a first position to a second, lower position, which can further enhance the haptic feedback that the haptic actuator provides.

The directional pad is preferably coupled to the body of the controller such that, without a user pressing on the upper surface of the shell, the arms are in their resting position (e.g., with no compressive pre-loading of the arms), which can best mitigate the transmission of vibrations from the haptic actuator to the controller body. Additionally, each of the arms preferably extends angularly in addition to downwardly such that there is an angular separation between the first and second ends of the arms. With such arms, downward compression of the arms can also cause rotational movement of the shell—the rotation of the shell relative to a user's finger can further enhance the haptic feedback provided by the vibrations of the haptic actuator, such as by making the simulated button press more perceivable to the user.

A user input device, such as a gaming controller, including one of the present directional pads and as disclosed in embodiments of this disclosure may be used by a user to provide user input to an information handling system. An information handling system generally processes, compiles, stores, and/or communicates information or data for business, personal, or other purposes thereby allowing users to take advantage of the value of the information. A user input device may be coupled to such an information handling system through wires and/or wireless connections, such as a universal serial bus (USB) connection or a Bluetooth, Wi-Fi, or other local area or personal area network connection. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such a gaming application, financial transaction processing, airline reservations, enterprise data storage, or global communications. In one example embodiment, an information handling system may execute a gaming application for processing user inputs from the gaming controller to generate an audio/visual (AV) stream for presentation to the user that includes a world generated based on the user input. In addition, information handling systems may include a variety of hardware and software components that may be configured to process, store, and communicate information and may include one or more computers systems, data storage systems, and networking systems.

Some of the present directional pads for a controller comprise a shell, a suspension system, and a haptic actuator. Some of the present controllers comprise a body, a plurality of buttons coupled to the body, and a directional pad comprising a shell, a suspension system, and a haptic actuator. The shell of the directional pad, in some embodiments, includes a top that has opposing upper and lower surfaces.

In some embodiments, the suspension system of the directional pad is coupled to the shell. The suspension system, in some embodiments, includes three or more elastic arms. Each of the arms, in some embodiments, extends between a first end that is coupled to the shell and a second end that is disposed lower than the shell and the first end of the arm. In some controllers, the second end of each of the arms is coupled to the body of the controller.

In some embodiments, in a planform of the suspension system, for each of the arms, an angular separation, taken about a center of the planform of the suspension system, between the first and second ends is at least 10°, optionally at least 30°. In some embodiments, in the planform of the suspension system and as taken about a center of the planform of the suspension system, for each of the arms, an angular separation between the second end of the arm and the second end of a first angularly adjacent one of the arms is approximately the same as an angular separation between the second end of the arm and the second end of a second angularly adjacent one of the arms.

In some embodiments, each of the arms has opposing upper and lower surfaces and an edge connecting the upper surface to the lower surface. For each of the arms, a first segment of the arm, in some embodiments, includes the first end and a first portion of the edge that subtends an angle that is greater than or equal to 90°. In some embodiments, for each of the arms, the first segment of the arm is disposed on the shell, a second segment of the arm includes the second end of the arm and is disposed lower than the first segment of the arm, and a third segment of the arm extends from the first segment to the second segment. For each of the arms, in some embodiments, the second segment of the arm includes a second portion of the edge and the third segment of the arm includes a third portion of the edge that extends from the first portion of the edge to the second portion of the edge and is linear.

In some controllers, the shell of the directional pad is movable relative to the body of the controller between first and second positions and the shell is lower when the shell is in the second position than when the shell is in the first position. In some controllers, for each of the arms, a difference between a height of the first end of the arm and a height of the second end of the arm when the shell is in the first position is within 5% of a difference between the height of the first end of the arm and the height of the second end of the arm when the arms are in a resting position. In some controllers, a force the arms exert on the shell when the shell is in the first position is less than or approximately equal to a weight of the directional pad.

In some controllers, a shell of the directional pad is disposed in an opening of the body of the controller. The body, in some controllers, includes, for each of the arms of the suspension system, a shelf disposed at a periphery of the opening. In some controllers, the second end of each of the arms is coupled to a respective one of the shelves of the body such that the shelf is disposed between the second end of the arm and the shell.

In some embodiments, the haptic actuator of the directional pad is configured to vibrate the shell. The haptic actuator, in some embodiments, comprises a linear resonant actuator configured to vibrate the upper surface of the top of the shell in a direction that is substantially parallel with a vertical axis that extends through the upper surface of the top of the shell.

Some embodiments comprise a capacitive touch sensor that is configured to measure a position at which an electrically-conductive object touches the upper surface of the top of the shell.

In some embodiments, the upper surface of the top of the shell has a circular planform.

In some controllers, the body of the controller has a main portion disposed between first and second gripping portions. Each of the gripping portions, in some controllers, project rearwardly away from the main portion. The directional pad, in some controllers, is disposed closer to the first gripping portion than to the second gripping portion. In some controllers, the directional pad is disposed closer to the front of the body than to a rearmost point of the first gripping portion. In some controllers, the buttons include four buttons that are each disposed closer to the second gripping portion than to the first gripping portion and closer to the front of the body than to a rearmost point of the second gripping portion. Some controllers comprise two thumbsticks. Each of the thumbsticks, in some controllers, is coupled to the main portion of the body. In some controllers, each of the thumbsticks is disposed closer to a rear of the main portion of the body than to the front of the body.

Some of the present methods of making a controller comprise inserting a directional pad into an opening of a portion of a body of the controller. The directional pad, in some methods, comprises a shell, a suspension system, and a haptic actuator. The shell, in some methods, includes a top that has opposing upper and lower surfaces. The suspension system, in some methods, is coupled to the shell and includes three or more elastic arms. Each of the arms, in some methods, extends between a first end that is coupled to a shell and a second end that is disposed further from the shell than is the first end. The haptic actuator, in some methods, is configured to vibrate the shell.

In some methods, the portion of the body of the controller comprises, for each of the arms of the suspension system, a shelf at a periphery of the opening and a space angularly disposed between two of the shelves. In some methods, the inserting is performed such that a segment of each of the arms that includes the second end of the arm passes through a respective one of the spaces. Some methods comprise rotating the inserted directional pad such that the segment of each of the arms is disposed on a respective one of the shelves and the shelf is disposed between the shell and the segment. Some methods comprise fixing the segment of each of the arms to the shelf that the segment is disposed on.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed embodiment, the terms "about" and "approximately" may be substituted with "within [a percentage] of" what is specified, where the percentage includes 0.1, 1, 5, and 10 percent.

The terms "comprise" and any form thereof such as "comprises" and "comprising," "have" and any form thereof such as "has" and "having," and "include" and any form thereof such as "includes" and "including" are open-ended linking verbs. As a result, a product or system that "comprises," "has," or "includes" one or more elements possesses those one or more elements but is not limited to possessing only those elements. Likewise, a method that "comprises," "has," or "includes" one or more steps possesses those one or more steps but is not limited to possessing only those one or more steps.

Any embodiment of any of the products, systems, and methods can consist of or consist essentially of—rather than comprise/have/include—any of the described steps, elements, and/or features. Thus, in any of the claims, the term "consisting of" or "consisting essentially of" can be substituted for any of the open-ended linking verbs recited above in order to change the scope of a given claim from what it would otherwise be using the open-ended linking verb.

Further, a device or system that is configured in a certain way is configured in at least that way, but it can also be configured in other ways than those specifically described.

The feature or features of one embodiment may be applied to other embodiments, even though not described or illustrated, unless expressly prohibited by this disclosure or the nature of the embodiments.

Some details associated with the embodiments described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

FIG. 1H is an exploded view of the directional pad of FIG. 1A in which the bottoms of components of the directional pad are viewable.

FIG. 1I is an exploded view of the directional pad of FIG. 1A in which the tops of components of the directional pad are viewable.

DETAILED DESCRIPTION

Figure 1A:
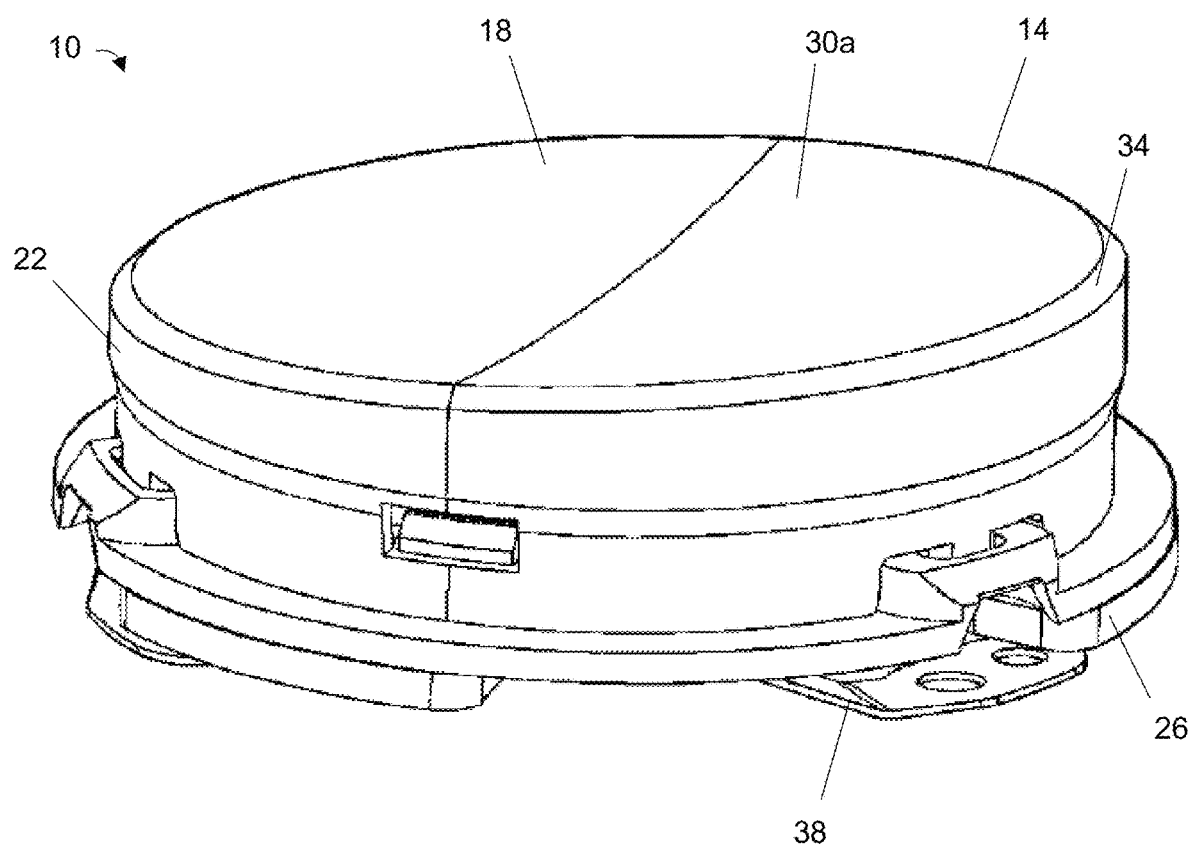
FIG. 1A is a perspective view of one of the present directional pads that includes a suspension system having three arms.
Figure 1B:
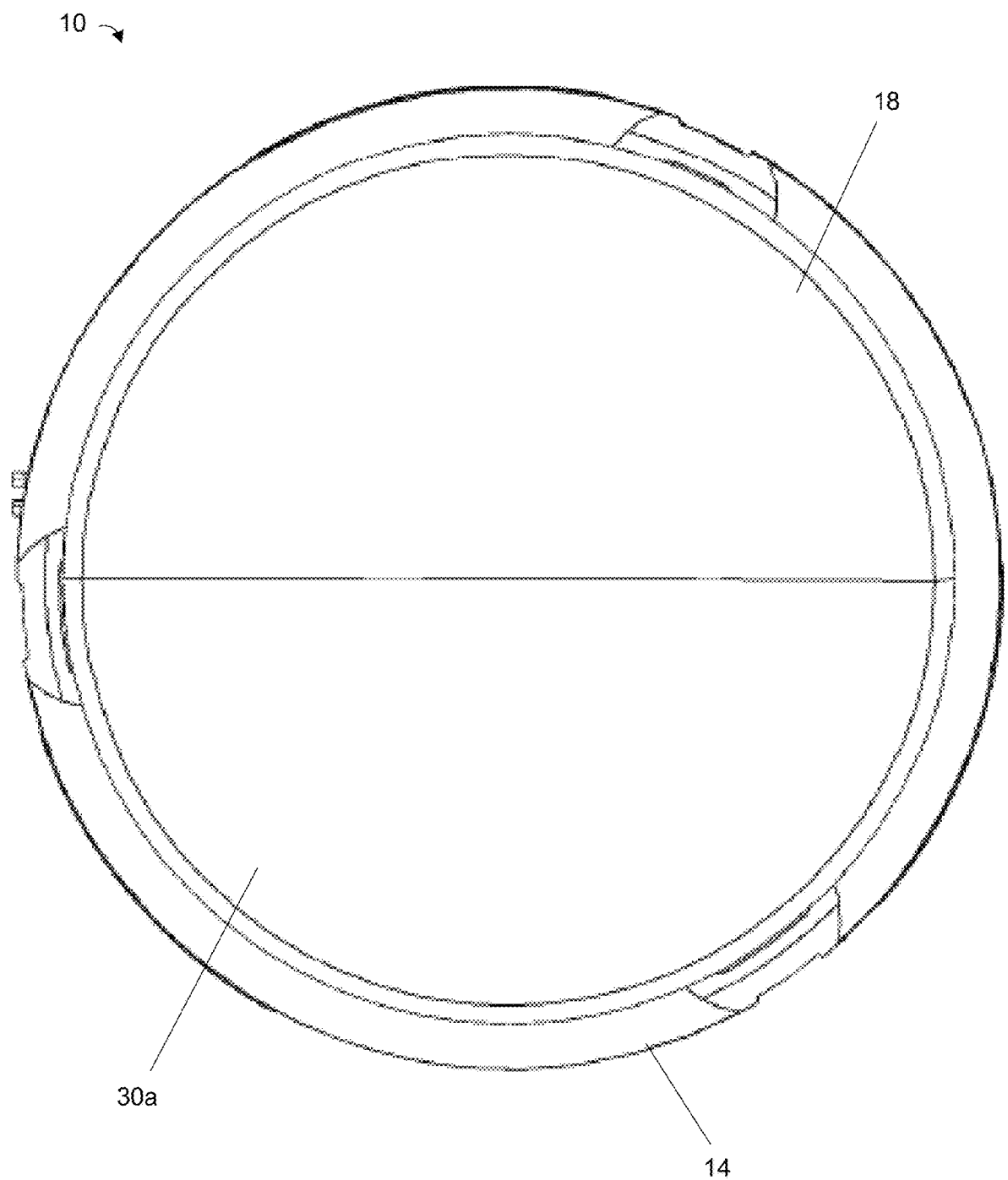
FIGS. 1B-1G are top, front, right, rear, left, and bottom views, respectively, of the directional pad of FIG. 1A.
Figure 1C:
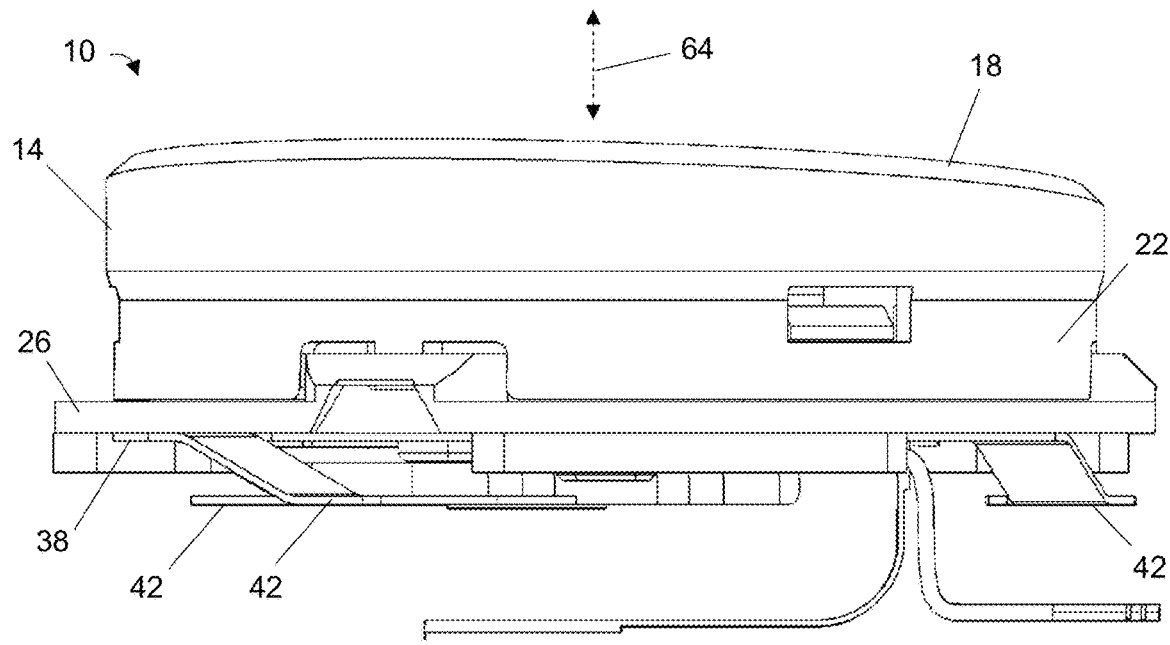
Figure 1D:
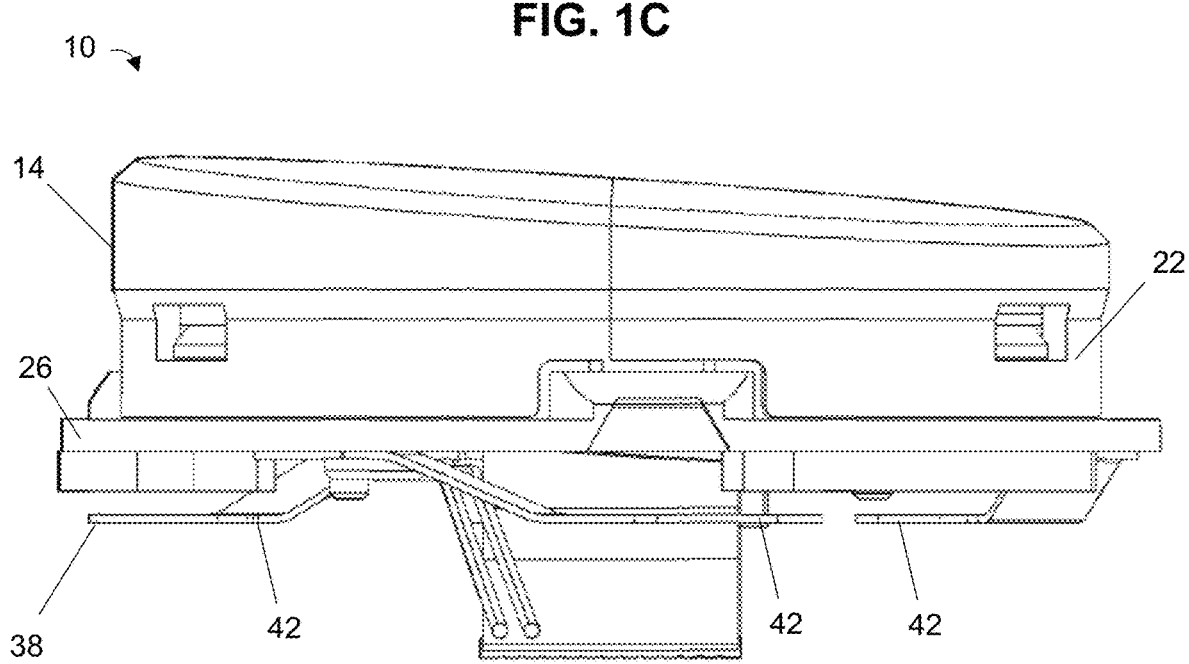
Figure 1E:
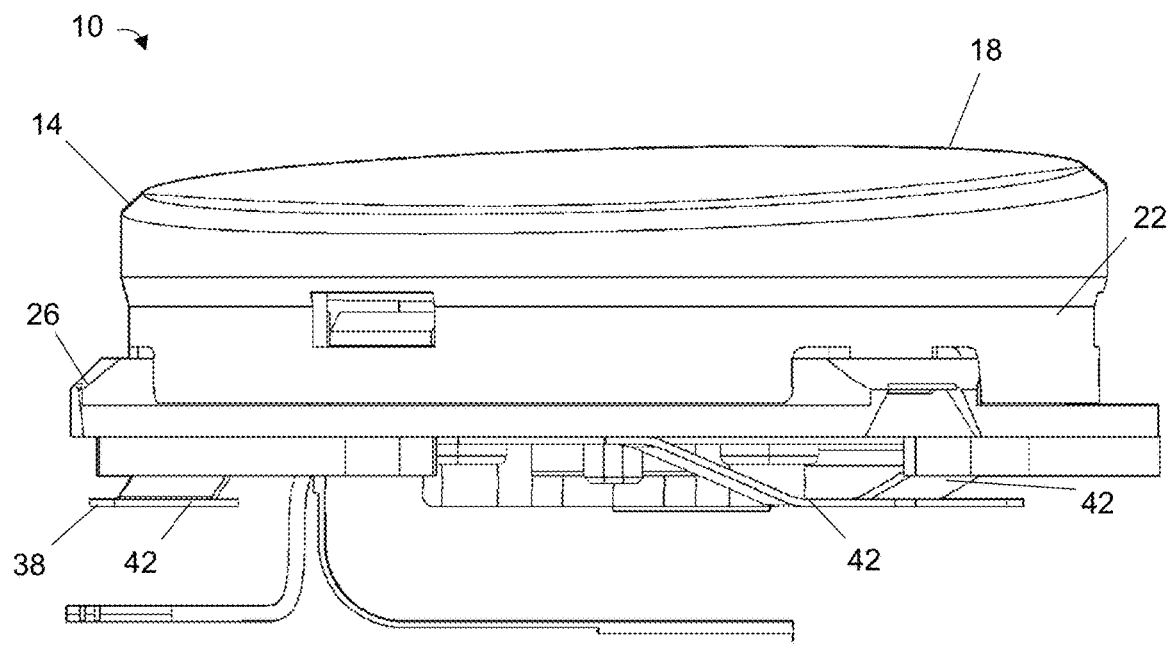
Figure 1F:
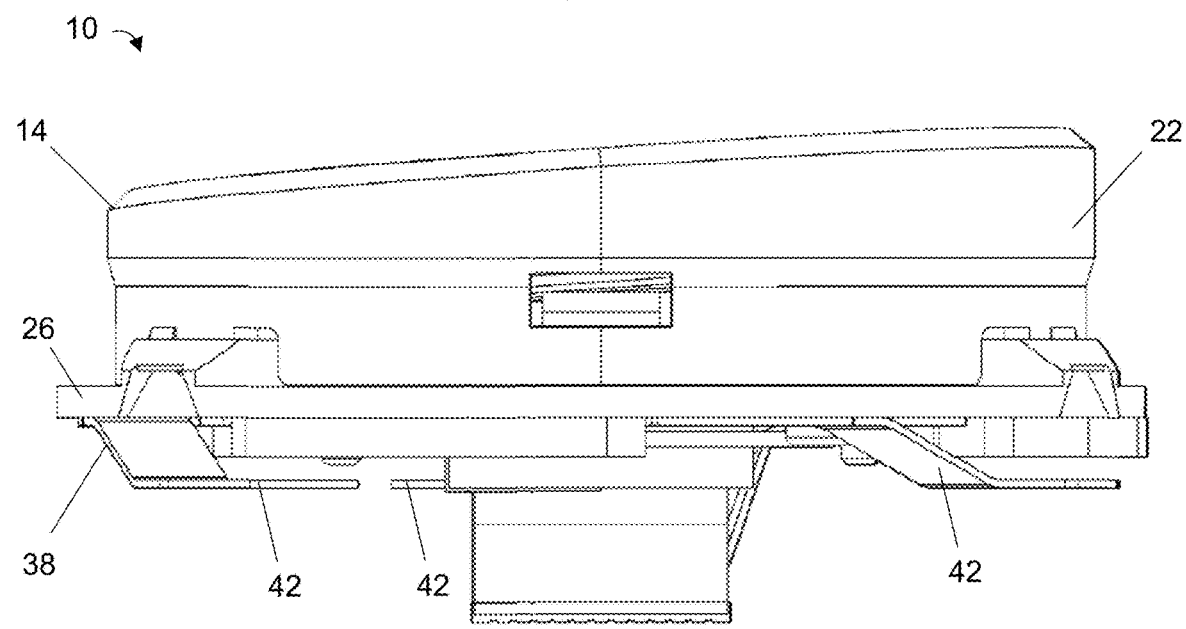
Figure 1G:
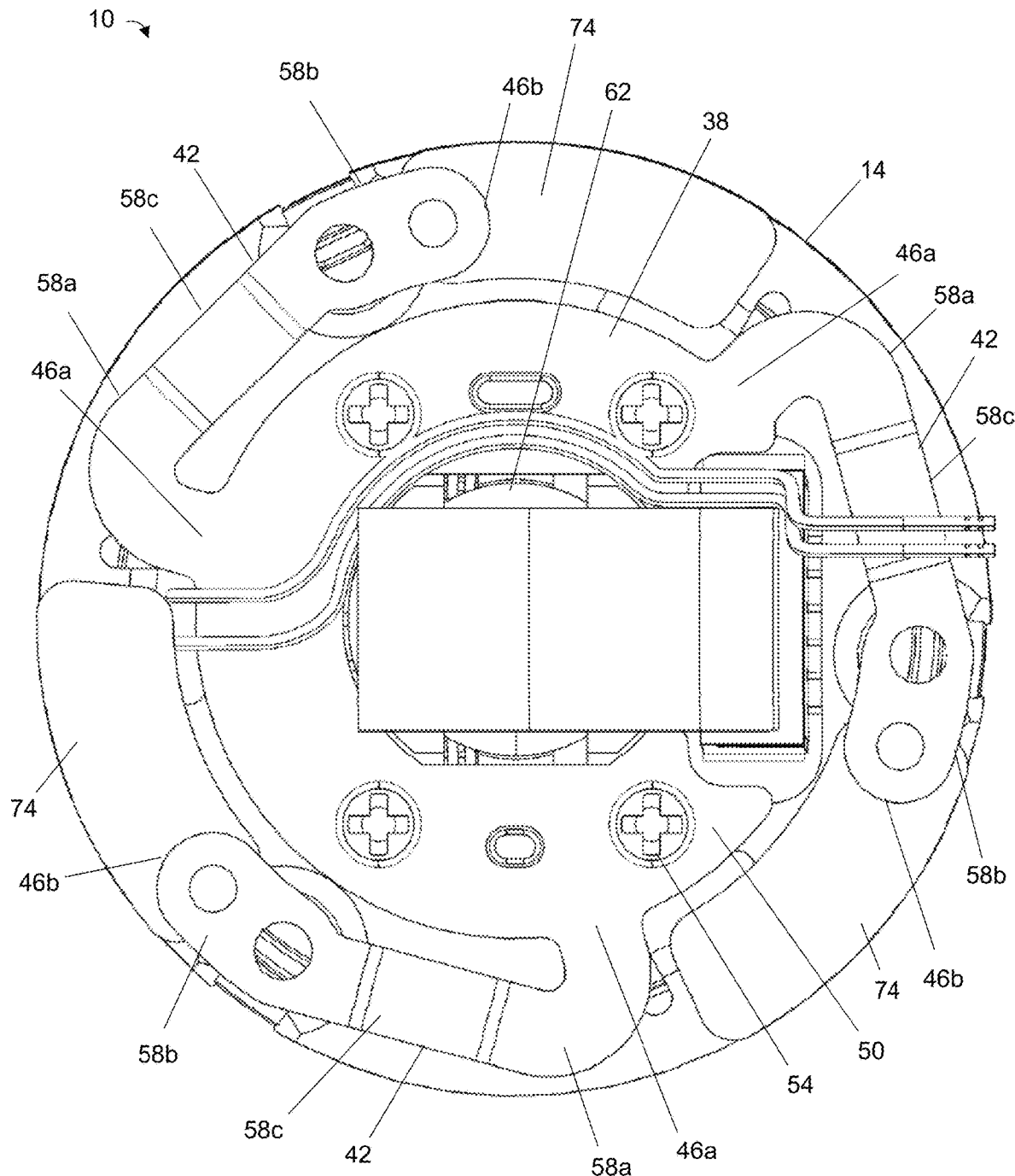

Referring to FIGS. 1A-1I, shown is an embodiment 10 of the present directional pads that has an upper surface 30a. Directional pad 10 can comprise a shell 14 having a top 18. Top 18 can define upper surface 30a and an opposing lower surface 30b, and a sidewall 22 can be disposed along at least a majority (up to and including substantially all) of a periphery 34 of the top and project downwardly away from the lower surface of the top. Shell 14 can also include a bottom 26 coupled to sidewall 22 such that the bottom, sidewall, and top 18 define an interior space that can house other components of directional pad 10; in other embodiments, however, the shell need not include an enclosing sidewall or bottom (e.g., with at least a portion of a controller body that the directional pad is coupled to defining a space with the top that houses other components of the directional pad).

Upper surface 30a of directional pad 10 can serve as the interface that a user interacts with to make user inputs with the directional pad. Directional pad 10 can include, for example, a touch sensor 66 (e.g., on a printed circuit board) that is configured to measure a position—such as an angular and/or radial position—at which an electrically-conductive object—such as the user's finger—touches upper surface 30a of the directional pad. As shown, touch sensor 66 can be coupled to lower surface 30b of shell 14's top 18, such as with an adhesive 70.

Touch sensor 66 can be a capacitive touch sensor having a plurality of electrodes to perform this touch-location determination. When a voltage is applied to an electrode of touch sensor 66, an electrostatic field can be generated; the electrostatic field can be distorted at a point where an electrically-conductive object like the user's finger touches upper surface 30a, thereby creating a change in a capacitance of the touch sensor at a location underlying that point. The change in capacitance be monitored (e.g., by a processor) to determine the touch location.

As one example, touch sensor 66 can be a self-capacitance touch sensor in which a voltage can be applied to each of the electrodes and a self-capacitance of the electrode (e.g., the capacitance between the electrode and a ground) can be monitored (e.g., by measuring a current through the electrode); when the electrically-conductive object touches a portion of upper surface 30a that overlies the electrode, the self-capacitance of the electrode can increase such that the touch sensor conveys a signal (e.g., a correspondingly higher current) indicating that the electrically-conductive object is touching the portion of the upper surface overlying the electrode. The electrodes can follow different paths to allow touch sensor 66 to measure when different portions of directional pad 10's upper surface 30a are touched. For example, the electrodes can be arranged in a grid with a first set of the electrodes extending in a widthwise direction at different positions along a lengthwise direction that is perpendicular to the widthwise direction, and a second set of electrodes can extend along the lengthwise direction at different positions along the widthwise direction. A change in capacitance in one of the electrodes of the first set and one of the electrodes of the second set can thus indicate a position in the lengthwise direction and on the widthwise direction, respectively, where a touch occurs.

As another example, touch sensor 66 can be a mutual-capacitance touch sensor in which the electrodes include a first set of electrodes overlapping a second set of electrodes to define a plurality of junctions where the electrodes cross over one another (e.g., in the above-described grid pattern). A voltage can be applied to each of the electrodes of the first set and, at each of the junctions, a capacitance between the electrode of the first set and the electrode of the second set at the junction can be monitored (e.g., by measuring a voltage on the electrode of the second set); when the electrically-conductive object touches a portion of upper surface 30*a* that overlies the junction, the capacitance can decrease such that the touch sensor conveys a signal (e.g., a changed voltage on the electrode of the second set) indicating that the electrically-conductive object is touching the portion of the upper surface overlying the junction.

The above-described configurations of touch sensor 66 are illustrative and are not limiting; any suitable touch sensor configuration can be used to allow the touch sensor to be used to determine where an electrically-conductive object touches directional pad 10's upper surface 30*a*. For example, in some embodiments, touch sensor 66 can be a resistive touch sensor instead of a capacitive touch sensor. And, in other embodiments, directional pad 10 can employ a different mechanism to determine where on the directional pad the user is making inputs, such as with a plurality of piezoelectric sensors that can each measure when a respective portion of the directional pad is pressed.

Directional pad 10 can comprise a haptic actuator 62 to provide haptic feedback to a user when the user interfaces with the directional pad, such as to signal that an input onto upper surface 30*a* has been successfully registered. The use of haptic actuator 62 may be particularly advantageous when directional pad 10 employs touch sensor 66, which-unlike pressable buttons-might not itself provide haptic feedback. To provide haptic feedback, haptic actuator 62 can be configured to vibrate shell 14 (e.g., the shell's top 18), and particularly the shell's upper surface 30*a*, such as in a direction that is substantially parallel with a vertical axis extending through the upper surface (e.g., in z-direction 64), which can simulate the feel of a button press. As shown, haptic actuator 62 comprises a linear resonant actuator; however, any suitable haptic actuator can be used, such as a piezoelectric actuator, an eccentric rotating mass actuator, and/or the like. Haptic actuator 62 can underlie shell 14's top 18 and, when directional pad 10 includes touch sensor 66, the touch sensor such that the haptic actuator does not interfere with the touch sensor's position-measuring functionality.

To promote the effectiveness of haptic actuator 62, directional pad 10 can comprise a suspension system 38 that is coupled to shell 14 and comprises arms 42 that can be used to couple the directional pad to a controller (e.g., 106) as described in further detail below; the suspension system's arms can, for example, mitigate the transmission of the haptic actuator's vibrations to the remainder of the controller and enhance the haptic feedback that the vibrations provide. As shown, suspension system 38 comprises three arms 42; however, in other embodiments, the suspension system can use more arms, such as greater than or equal to any one of, or between any two of, four, five, six, seven, or eight arms.

Each of arms 42 can be elastic and, referring additionally to FIGS. 2A-2G, can extend from a first end 46*a* that is coupled to shell 14 (e.g., to the shell's bottom 26) and a second end 46*b* that is disposed lower than the first end and the shell (and, as described in further detail below, can be coupled to the body of a controller). As shown, first ends 46*a* of arms 42 can be coupled to shell 14 via a main body 50 of suspension system 38 that is coupled to the first ends (e.g., is integral with the first ends) and to the shell (e.g., with fasteners 54, such as to bottom 30); in other embodiments, however, the arms can be independently coupled to the shell (e.g., with no main body extending between them). With arms 42 being elastic and extending downwardly away from shell 14, the arms can act as springs that help mitigate vibration transfers from haptic actuator 62 to the remainder of a controller, and can also allow downward movement of shell 14 when a user presses on the shell's upper surface 30*a* (e.g., to enhance haptic feedback) and restore the shell to its original position when the user releases the upper surface. Arms 42 can each comprise any suitable material and have any suitable thickness 48, measured between opposing upper and lower surfaces 82*a* and 82*b* of the arm, to yield an elasticity that allows the arms to support directional pad 10 while also facilitating vibration isolation and permitting downward movement of shell 14. For example, each of arms 42 can comprise a metal like steel (e.g., stainless steel) and can have a thickness 48 that is less than or equal to any one of, or between any two of, 0.8, 0.7, 0.6, 0.5, 0.4, 0.3, 0.2, or 0.1 millimeters (mm) (e.g., between 0.1 and 0.5 mm, such as about 0.3 mm).

Arms 42 can have a geometry that also yields rotational movement of shell 14 when the shell is pressed downward—the rotation of the shell's upper surface 30*a* relative to a user's finger can enhance the haptic feedback provided by haptic actuator 62's vibrations, such as by promoting the simulated button-press feeling. To do so, in addition to extending downwardly from shell 14, each of arms 42 can extend angularly about a center of the shell. As a result, in a planform of suspension system 38, for each of arms 42, there can be an angular separation 78 between first end 46*a* and second end 46*b*, which as taken about the center of the suspension system can be greater than or equal to any one of, or between any two of, 10°, 20°, 30°, 40°, 50°, 60°, 70°, 80°, or 90° (e.g., greater than or equal to 30°, such as between 30° and 80°). Compression of each arm 42 may accordingly cause at least some of the arm's downward displacement (e.g., with a difference 102 between a height of first end 46*a* and a height of second end 46*b* decreasing) to translate to angular displacement (e.g., with angular separation 78 between the first and second ends being larger when the arm is compressed) to cause shell 14 to rotate.

In the embodiment shown, to extend downwardly from and angularly about shell 14, each arm 42 can have a first segment 58*a* that includes first end 46*a* and a second segment 58*b* that includes second end 46*b*. In first segment 58*a*, which can be coupled to shell 14, a first portion 90*a* of an edge 86 that connects arm 42's upper surface 82*a* to its lower surface 82*b* can—whether the first portion is curved and/or includes a plurality of angularly-disposed linear segment—subtend an angle 94*a* that is greater than or equal to any one of, or between any two of, 90°, 95°, 100°, 105°, 110°, 115°, 120°, or 125° (e.g., between 95° and 120°) such that the arm is directed in an angular direction. In second segment 58*b*, which can be disposed lower than first segment 58*a*, a second portion 90*b* of edge 86 can, but need not, be shaped so that the arm is directed further in an angular direction. For example, second portion 90*b* of edge 86 can-whether the second portion is curved and/or includes a plurality of angularly-disposed linear segments-subtend an angle 94*b* that is greater than or equal to any one of, or between any two of, 10°, 15°, 20°, 25°, 30°, 35°, or 40° (e.g., between 20° and 35°). A third segment 58*c* of arm 42 can extend between first segment 58*a* and second segment 58*b* and can include a third portion 90*c* of edge 86 that extends from the edge's first portion 90*a* to the edge's second portion 90*b*. With first and second segments 58*a* and 58*b* disposed at different heights (e.g., with a portion of upper surface 82*a* in the first segment substantially parallel with a portion of upper surface 82*b* in the second segment), arm 42 can be directed downwardly in its connecting third segment 58*c* (e.g., with the portion of the third segment at the first segment higher than the portion of the third segment at the second segment); the third segment can thus permit compression of the arm. Third portion 90*c* of edge 86 can be linear such that, in a planform of suspension system 38, third segment 58*c* also continues along the direction set by first segment 58*a*, thereby facilitating the rotational movement that occurs with compression of arm 42. This arm geometry is provided by way of illustration; in other embodiments, an arm 42 can have any suitable geometry to position the arm's second end 46*b* lower than and angularly separated from the arm's first end 46*a*.

Figure 2A:
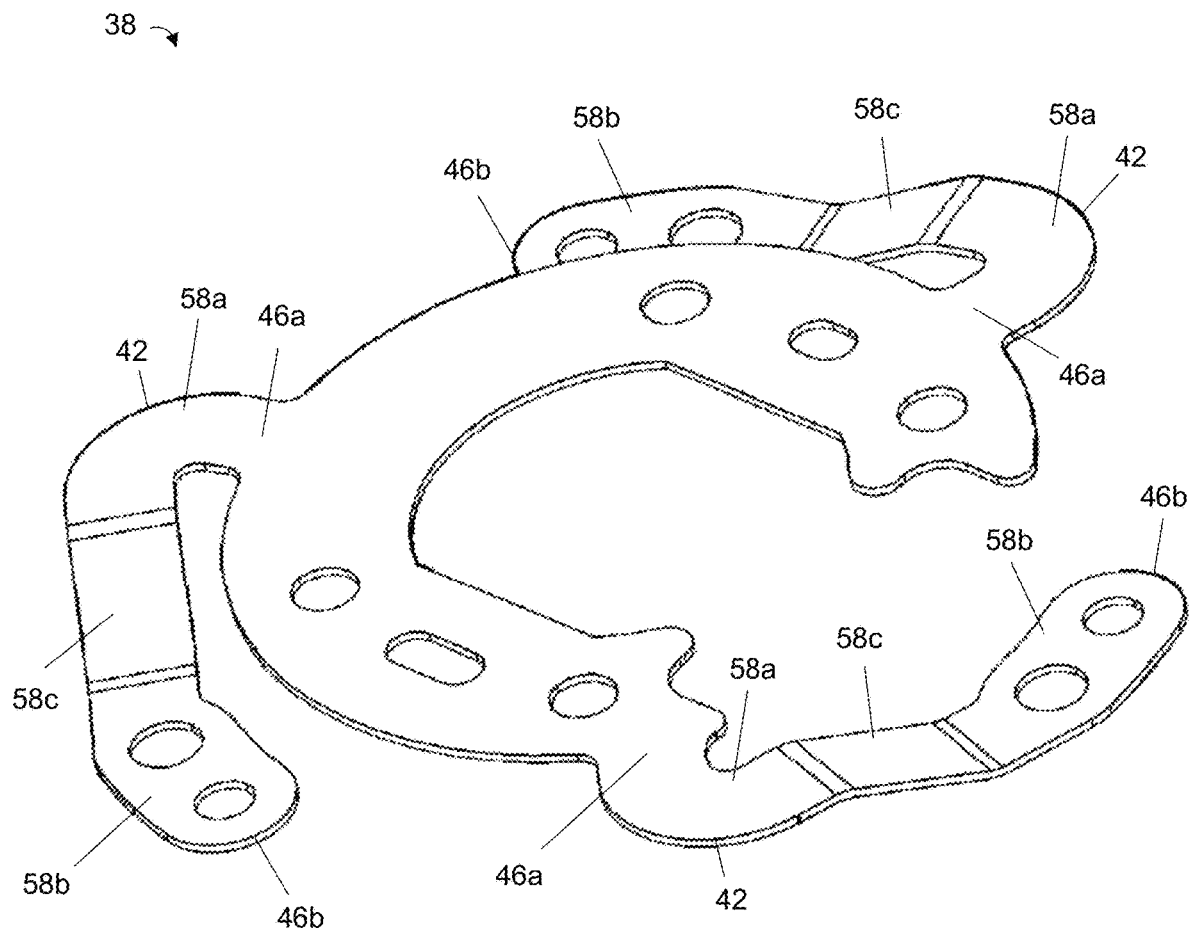
FIG. 2A is a perspective view of the suspension system of the directional pad of FIG. 1A.
Figure 2B:
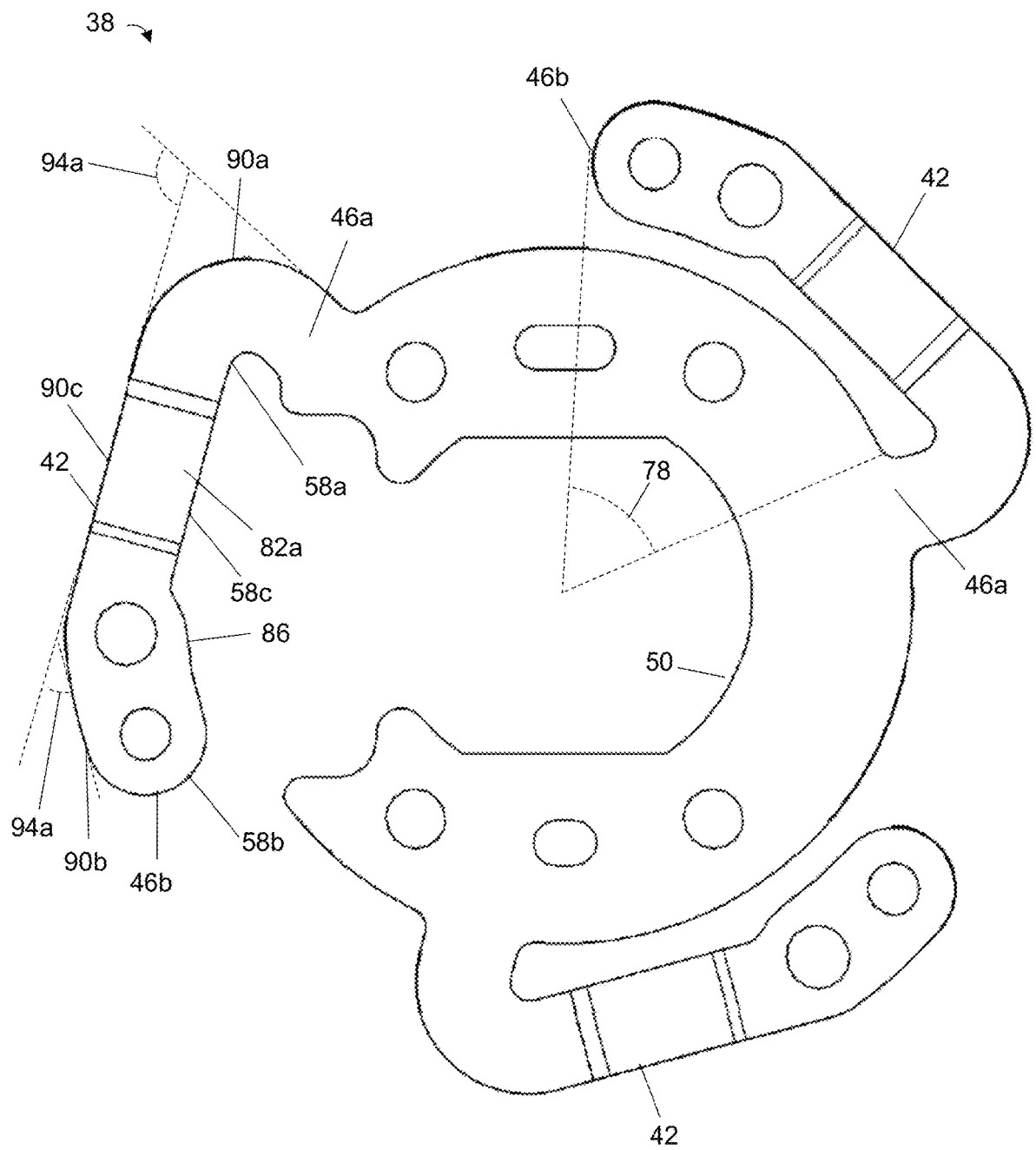
FIGS. 2B-2G are top, bottom, front, right, rear, and left views, respectively, of the suspension system of FIG. 2A.
Figure 2C:
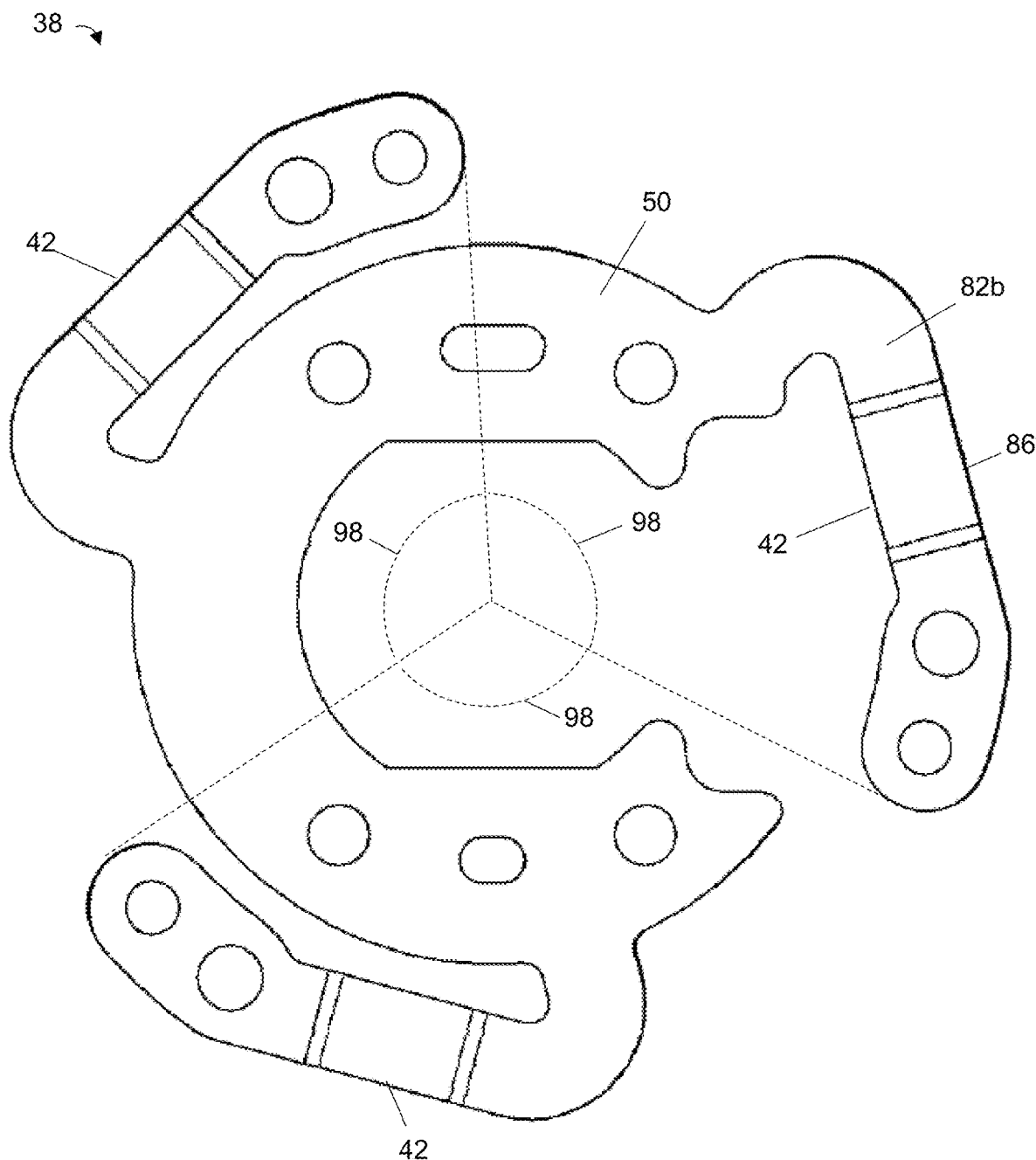
Figure 2D:
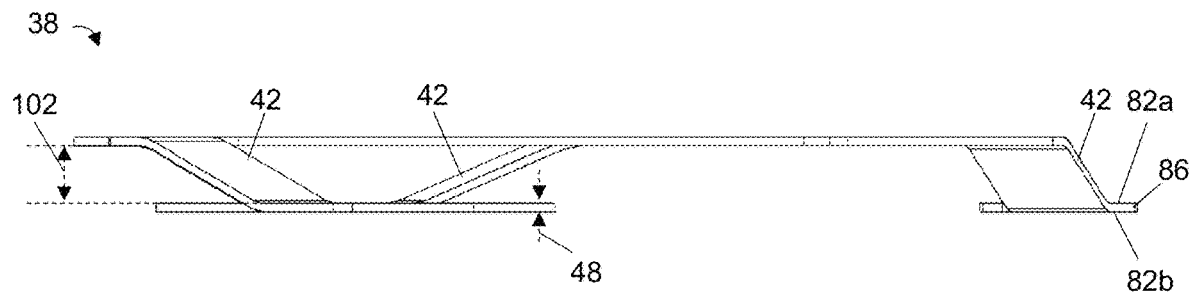
Figure 2E:
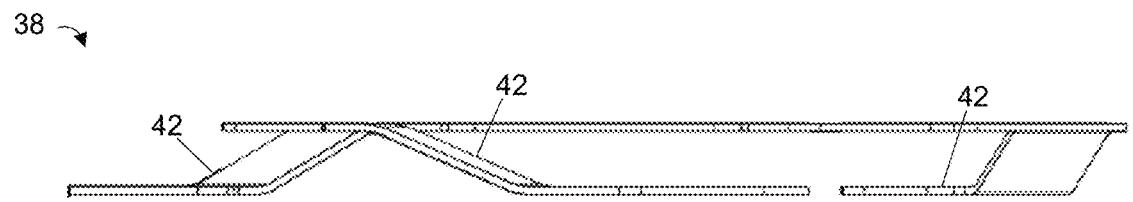
Figure 2F:
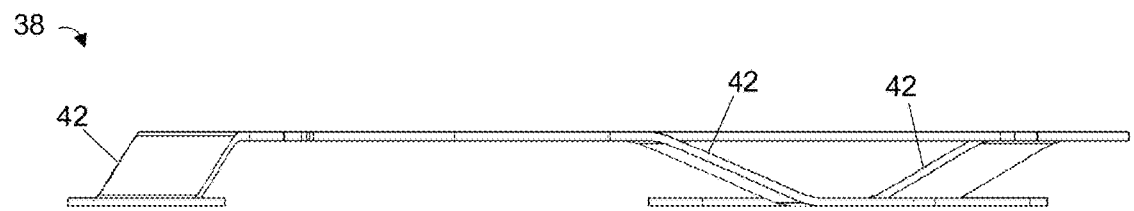
Figure 2G:
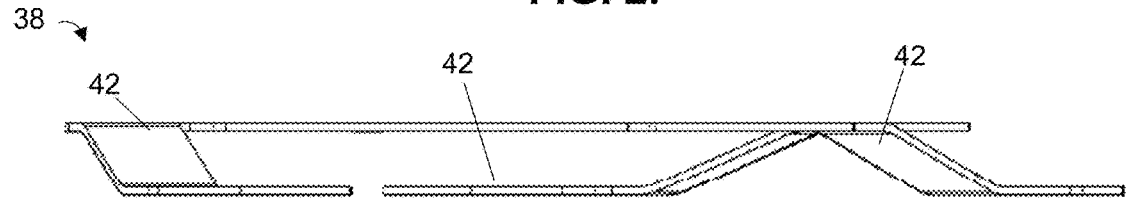

Each of arms 42 can be equiangularly disposed about the center of the planform of suspension system 38, with the arms extending in the same angular direction to facilitate rotational movement of shell 14 when the arms are compressed. With such positioning, in the planform of suspension system 38 and as taken about the center of the planform, for each of arms 42, an angular separation 98 between second end 46*b* of the arm and the second end of a first angularly adjacent arm (e.g., one of the two closest arms, taken in an angular direction) can be approximately the same as angular separation 98 between the second end of the arm and the second end of a second angularly adjacent one of the arms (e.g., the other of the two closest arms, taken in the angular direction) (FIG. 2C). As shown, with three arms 42, angular separation 98 between second ends 46*b* of each angularly adjacent pair of arms can be approximately 120°. The angular separations between first ends 46*a* of angularly-adjacent arms 42 can likewise be approximately the same.

Directional pad 10 can also comprise one or more bumpers 74 coupled to shell 14 (e.g., to the shell's bottom 26), which as described in further detail below can help support and thus stabilize the directional pad when it is coupled to a controller. Bumper(s) 74 can comprise a resilient material such as foam to permit downward movement of shell 14 when it is pressed. However, bumper(s) 74 are optional, as suspension system 38 can itself provide sufficient stability to directional pad 10 when the directional pad is coupled to a controller.

Directional pad 10 can have any suitable geometry to facilitate a user's interaction with the directional pad. For example, because an action to be controlled can depend on the angular position of the input into directional pad 10 (e.g., whether a top, right, bottom, or left portion of upper surface 30*a* is selected), the upper surface of shell 14's top 18 can have a circular planform that is consonant with such angular-position-based control; however, in other embodiments, the top's upper surface can have a planform of any suitable shape, such as a polygonal (e.g., hexagonal, octagonal, or the like) shape. Additionally, to fit on a handheld controller, directional pad 10 can be relatively compact. For example, a transverse dimension (e.g., diameter) of upper surface 30*a* of shell 14's top 18 can be less than or equal to any one of, or between any two of, 55, 50, 45, 40, or 35, 30, 25, or 20 mm (e.g., between 20 and 40 mm). Upper surface 30*a* of shell 14's top 18 can also be smooth, and optionally concave, to facilitate a user's ability to scroll across the upper surface to make different inputs (e.g., without lifting a finger); such a configuration may be particularly well-suited with a directional pad 10 including a touch sensor 66 as described above, with haptic actuator 62 vibrating the shell each time a different input is registered.

Referring additionally to FIGS. 3A-3D, shown is a controller 106 that can comprise a body 110 and directional pad 10 (e.g., any of the directional pads described above) coupled to the body such that the directional pad's upper surface 30*a* faces upward to allow a user to interact with it. Controller 106 can also comprise a plurality of buttons 114*a*-114*e* coupled to the body, which can be used to make inputs other than those made using directional pad 10.

Figure 3A:
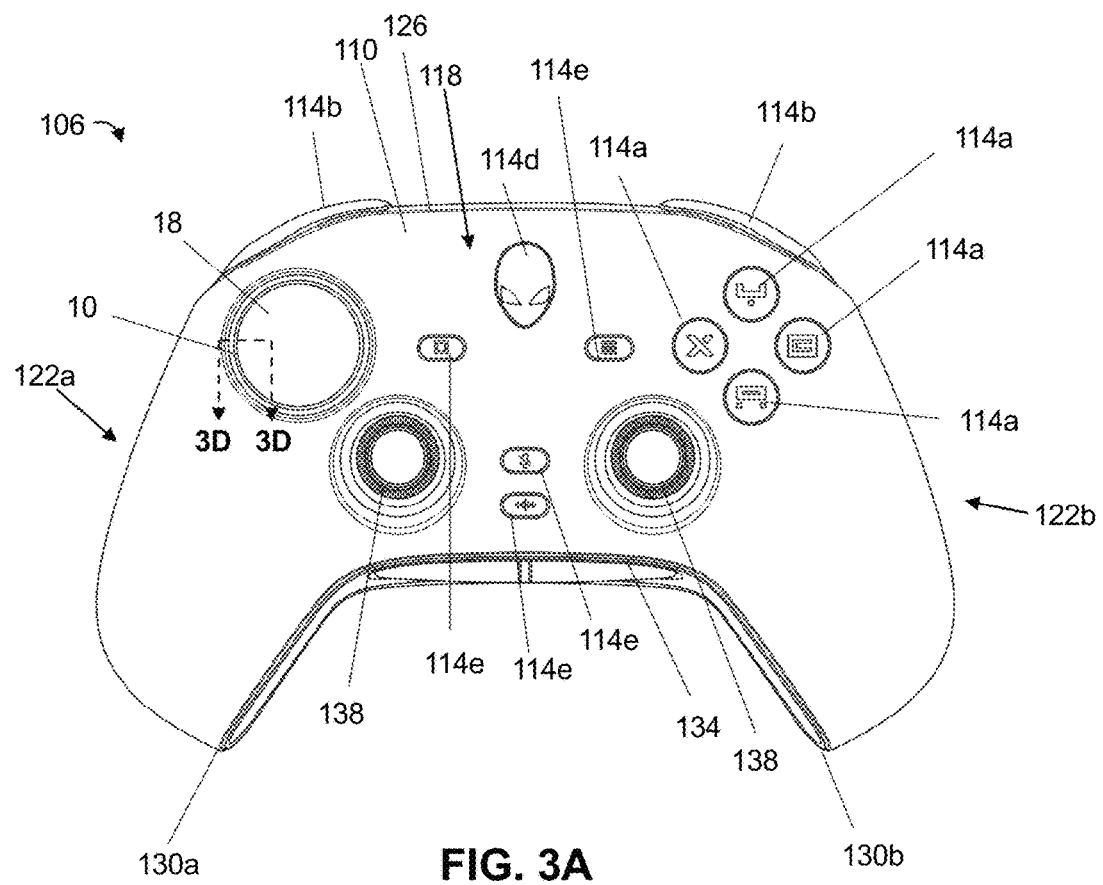
FIG. 3A is a top view of one of the present controllers that includes the directional pad of FIG. 1A.
Figure 3B:
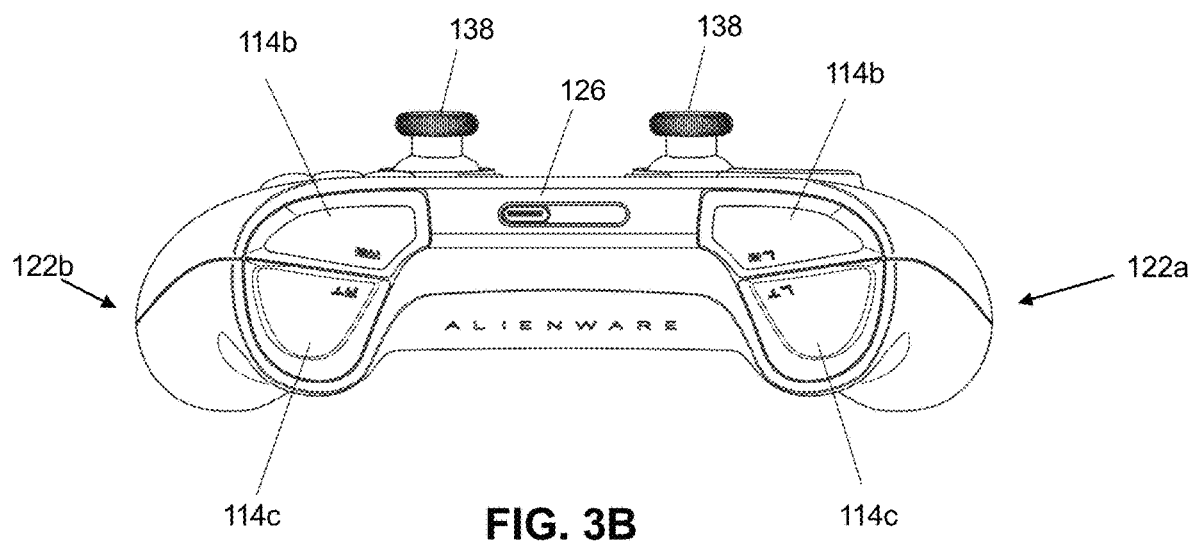
FIG. 3B is a front view of the controller of FIG. 3A.
Figure 3C:
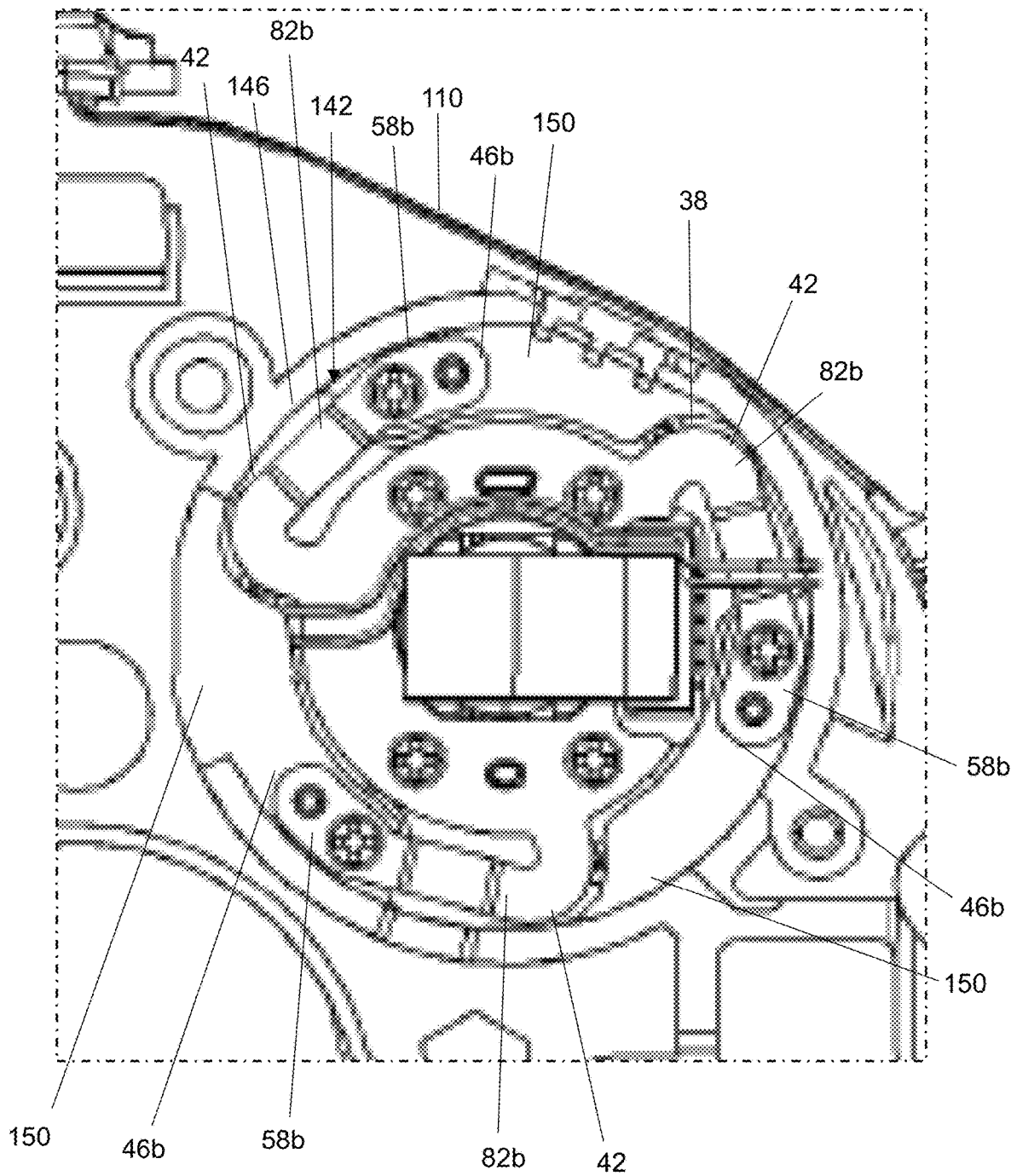
FIG. 3C is a bottom view of a portion of the controller's body and illustrates how the suspension system couples the directional pad to the body.
Figure 3D:
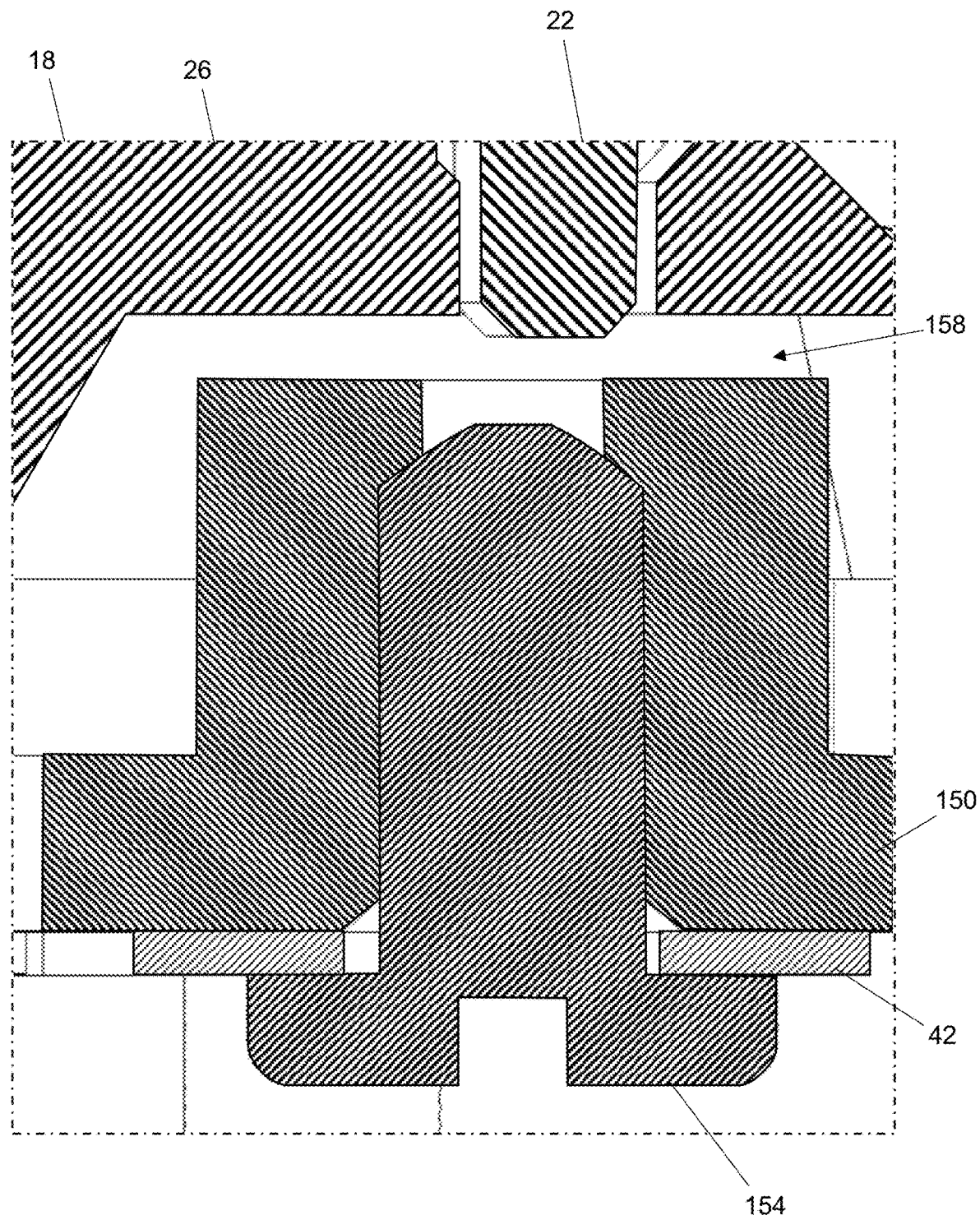
FIG. 3D is a partial sectional view of the controller of FIG. 3A taken along line 3D-3D of FIG. 3A.

As shown, suspension system 38 of directional pad 10 can be used to couple the directional pad to controller 106's body 110. While first end 46*a* (and first segment 58*a*) of each of arms 42 can be coupled to directional pad 10's shell 14, second end 46*b* (and second segment 58*b*) of each of the arms can be coupled to body 110 of controller 106 (FIGS. 3C and 3D). For example, body 110 can include an opening 142 that receives directional pad 10's shell 14 and a plurality of shelves 150 (e.g., one for each arm 42) that are each at a periphery 146 of the opening; the second end (and second segment) of each of the arms can be coupled to a respective one of the shelves (e.g., using one or more fasteners 154), optionally such that the shelf is disposed between the second end of the arm and the shell. Arms 42 of suspension system 38 can thus suspend directional pad 10's shell 14 relative to controller 106's body 110 such that there is a space 158 disposed between the shell (e.g., the shell's bottom 26) and the body. This can in turn mitigate vibration transfers from haptic actuator 62 to body 110 with little dampening of the vibrations imparted on shell 14 to promote the haptic feedback provided by haptic actuator 62. The presence of space 158 between shell 14 and body 110 can also allow the above-described downward (and rotational) movement of shell 14 relative to the body (e.g., between first and second positions, where the shell is positioned lower when the shell is in the second position than when the shell is in the first position) to enhance the haptic feedback provided by haptic actuator 62. Shell 14 can move only a small distance when pushed from the first position to the second position to enhance the haptic feedback (e.g., the simulated button press) of haptic actuator 62; for example, the shell can move downward by less than or equal to any one of, or between any two of, 1.2, 1.1, 1.0, 0.9, 0.8, 0.7, 0.6, 0.5, 0.4, or 0.3 mm (e.g., between 0.4 and 1.0 mm).

Arms 42 of suspension system 38 are preferably not compressed (or are at least subject to minimal compression) beyond a resting position—which is the position the arms assume when second ends 46*b* of the arms rest on a surface to support the weight of directional pad 10 without additional forces being exerted on the directional pad—to best mitigate the transmission of vibrations to body 110 and thereby enhance the haptic feedback provided by haptic actuator 62. For example, for each of arms 42, a difference 102 between the height of first end 46*a* of the arm and the height of second end 46*b* of the arm (FIG. 2D) when shell 14 is in the first position can be within 5%, 4%, 3%, 2%, or 1% of the difference between the heights of the first end of the arm and the second end of the arm when the arms are in the resting position. As a result, a force that arms 42 exert on shell 14 when the shell is in the first position can be less than or approximately equal to a weight of directional pad 10.

If directional pad 10 includes bumper(s) 74, the bumper(s) can extend from shell 14 to controller 106's body 110 to contribute to the support of the shell. In the embodiment shown, there can be a plurality of bumpers 74 (e.g., one for each arm 42), and each can extend from shell 14 to a respective one of shelves 150 of body 110. As described above, bumper(s) 74 can each comprise a resilient material such that the bumper is compressible, thereby allowing movement of the shell between the first and second positions.

Controller 106 can have any suitable shape and any suitable configuration of buttons 114a-114e for control in a variety of applications, such as in software applications like gaming applications. As shown, controller 106 can be a handheld controller; the controller's body 110 can include a main portion 118 disposed between first and second gripping portions 122a and 122b, which can each project rearwardly away from the main portion to provide an area that allows a user to comfortably hold the controller. Directional pad 10 and buttons 114a-114e can be positioned such that a user has ready access to both the directional pad and the buttons to make inputs while holding controller 106. For example, directional pad 10 can be disposed closer to first gripping portion 122a than to second gripping portion 122b, while four buttons 114a (e.g., A-, B-, X-, and Y-buttons) can be disposed closer to the second gripping portion than to the first gripping portion. Additionally, directional pad 10 and buttons 114a can each be positioned in a front portion of controller 106's body 110 to facilitate access thereto, e.g., with the directional pad disposed closer to a front 126 of the body than to a rearmost point 130a of first gripping portion 122a (e.g., the point on the first gripping portion that is furthest from the body's front) and the four buttons each disposed closer to the front of the body than to a rearmost point 130b of second gripping portion 122b (e.g., the point on the second gripping portion that is furthest from the body's front).

Controller 106's buttons can also include two bumpers 114b, two triggers 114c, a power button 114d (e.g., to power the controller on and off), and a plurality of accessory buttons 114e (e.g., for menu selection, muting a microphone, initiating a voice command, and/or the like) to provide a user more control options. While directional pad 10 and buttons 114a, 114d, and 114c can be coupled to a top-facing surface of body 110 (e.g., with buttons 114d and 114e coupled to the body's main portion 118), bumpers 114b and triggers 114c can be coupled to a front-facing surface of the body's front 126 to allow controller 106's buttons to be packaged in a readily-holdable form factor that permits ready access to the buttons. As shown, for example, each of bumpers 114b and each of triggers 114c can be disposed closer to a respective one of first and second gripping portions 122a and 122b than to the other of the first and second gripping portions, with each bumper disposed over a respective one of the triggers.

Controller 106 can also include two thumbsticks 138, which can each be pivotably coupled to a top-facing surface of body 110 (e.g., such that the thumbstick can pivot about multiple axes) to allow a user to make, for example, directional inputs based on the pivoting angle and direction of the thumbstick. Thumbsticks 138 can be positioned such that a user can readily control them with the user's thumbs. For example, each of thumbsticks 138 can be coupled to body 110's main portion 118 and can be disposed closer to a rear 134 of the main portion of the body than to the body's front 126.

As shown, controller 106 can be a wireless controller (e.g., comprising a transceiver configured to transmit commands) to promote mobility. To power the components of controller 106, the controller can include a battery. Suspension system 38's ability to improve the haptic feedback provided by haptic actuator 62 can be particularly advantageous with a battery-powered controller 106, as the more-efficient haptic feedback allows for the use of a haptic actuator with lower power requirements to reduce power draw from the battery and thereby extend battery life. In other embodiments, however, controller 106 can be a wired controller (e.g., with a wire configured to be coupled to an information handling system such that commands can be transmitted to the information handling system over the wire and power can be supplied to the controller over the wire).

Figure 4A:
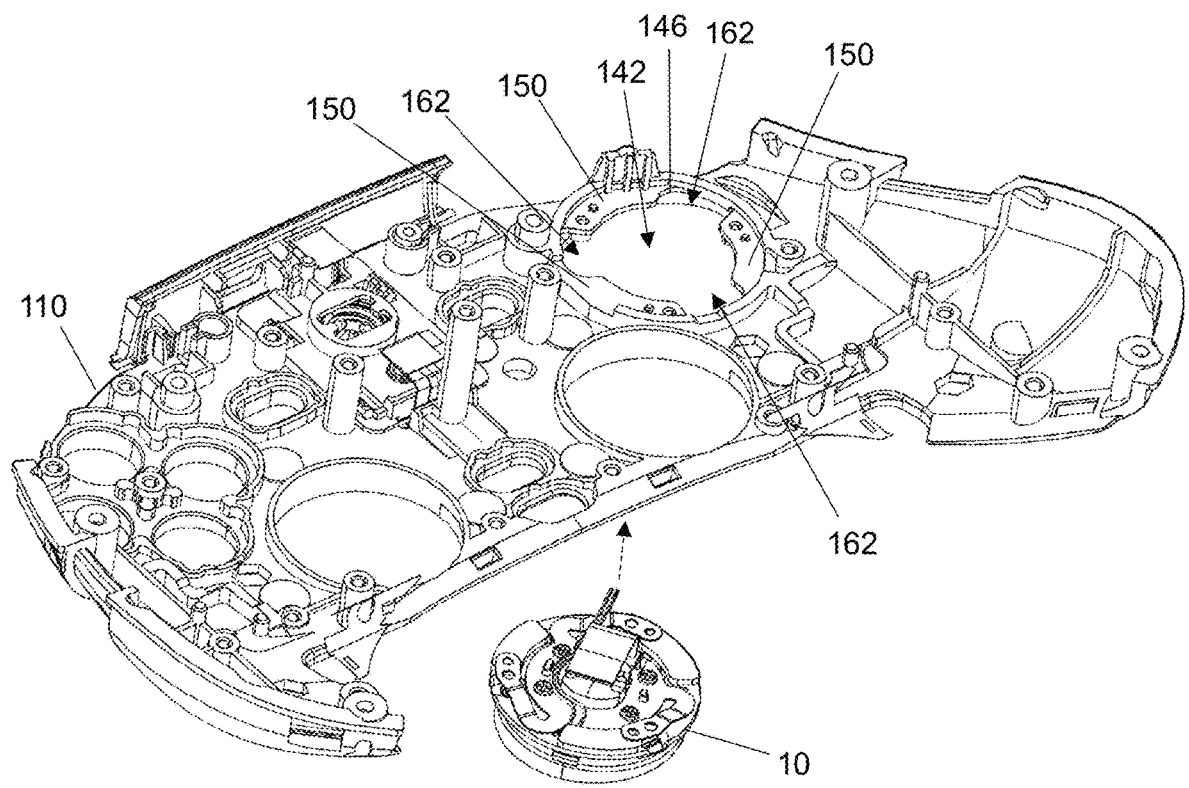
FIG. 4A illustrates the insertion of the directional pad of FIG. 1A into an opening of a portion of the controller of FIG. 3A when assembling the controller.
Figure 4B:
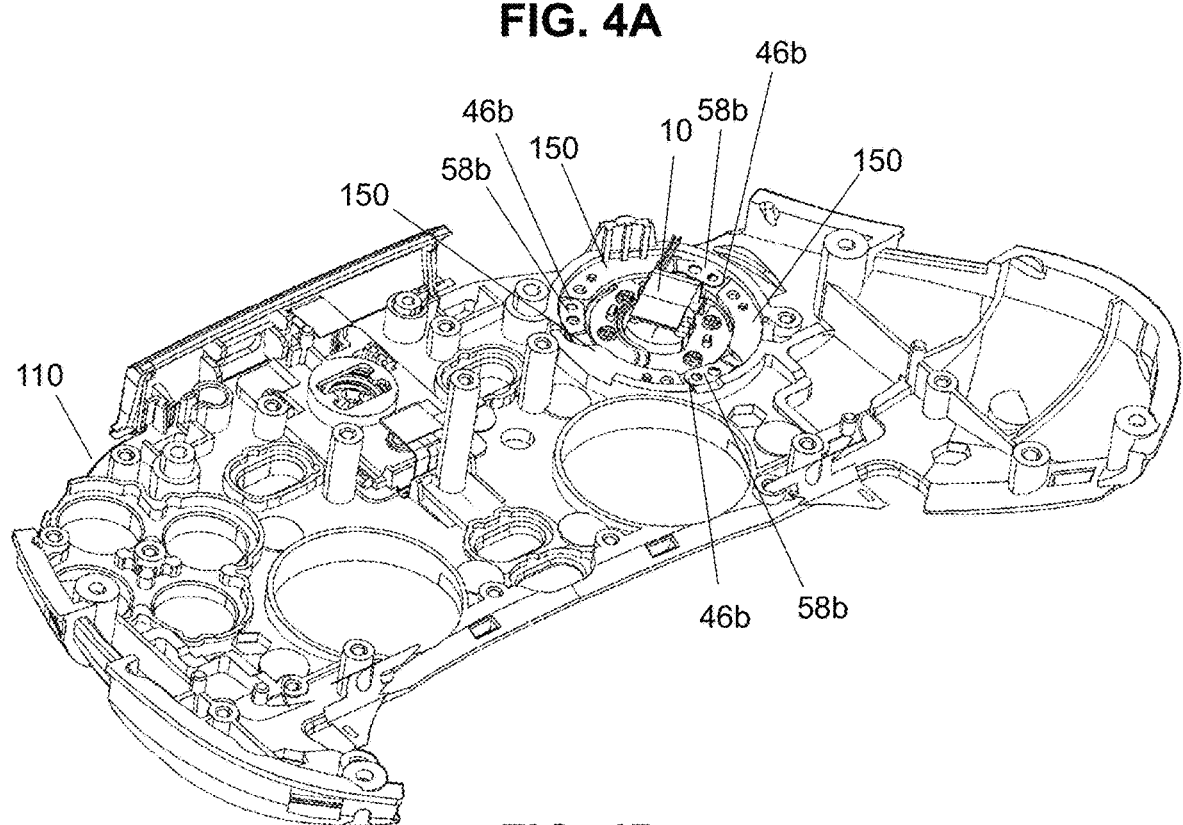
FIG. 4B illustrates the directional pad of FIG. 1A inserted into the opening of the portion of the controller of FIG. 3A such that a segment of each of the arms of the suspension system is passed through a space angularly disposed between two shelves that are at a periphery of the opening.

Referring to FIGS. 4A-4D, shown is one of the present methods of making a controller (e.g., 106) that includes a directional pad (e.g., 10) (e.g., any of the controllers and directional pads described above). Some methods comprise inserting the directional pad into an opening (e.g., 162) of a portion of a body (e.g., 110) of the controller (FIG. 4A). The portion of the body of the controller can comprise, for each of the arms (e.g., 42) of the suspension system (e.g., 38) of the directional pad, a shelf (e.g., 150) at a periphery (e.g., 146) of the opening and a space (e.g., 162) that is disposed between two of the shelves; as shown, the suspension system includes three arms and the portion of the body thus includes three shelves and three spaces that angularly separate the shelves. With the second end (e.g., 46b) of each of the arms disposed further from the shell (e.g., 14) of the directional pad than is the first end of the arm, when the directional pad is inserted into the opening of the portion of the body of the controller, the segment (e.g., 58b) of each arm that includes the second end can pass through a respective one of the spaces (FIG. 4B).

Figure 4C:
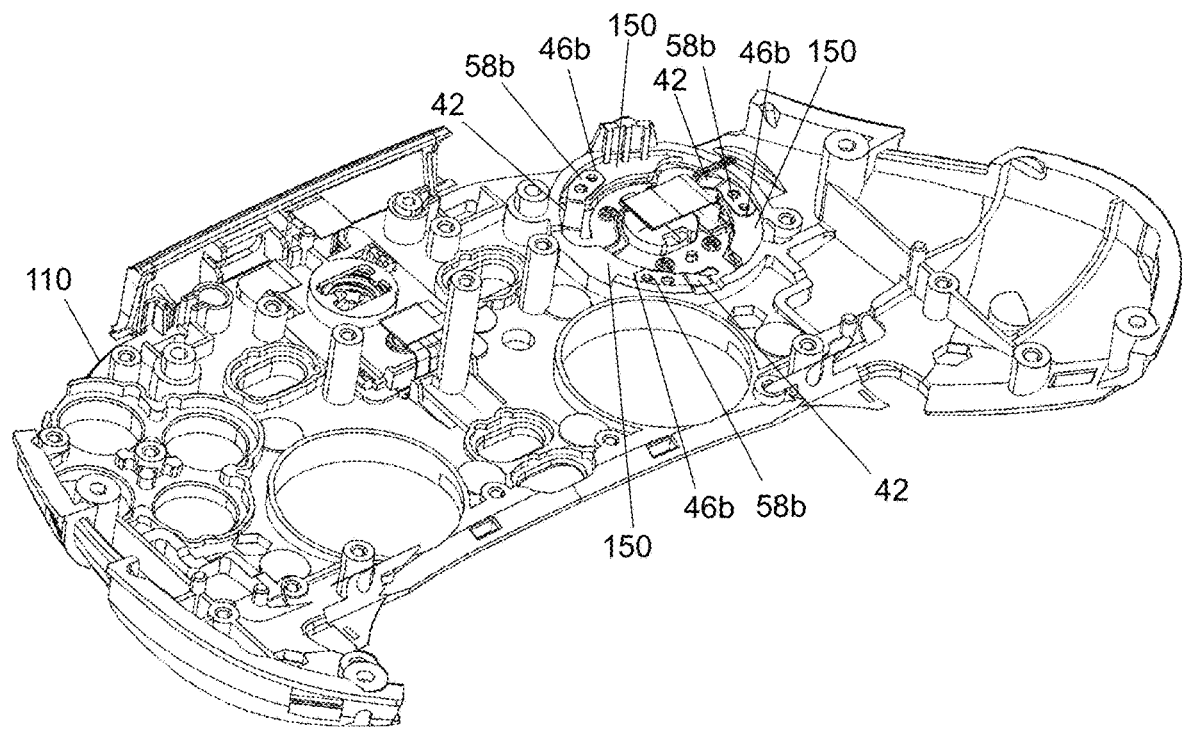
FIG. 4C illustrates the directional pad of FIG. 1A inserted into the opening of the portion of the controller of FIG. 3A and rotated such that a segment of each of the arms of the suspension system is disposed on a respective one of the shelves of the controller body that are at the periphery of the opening.
Figure 4D:
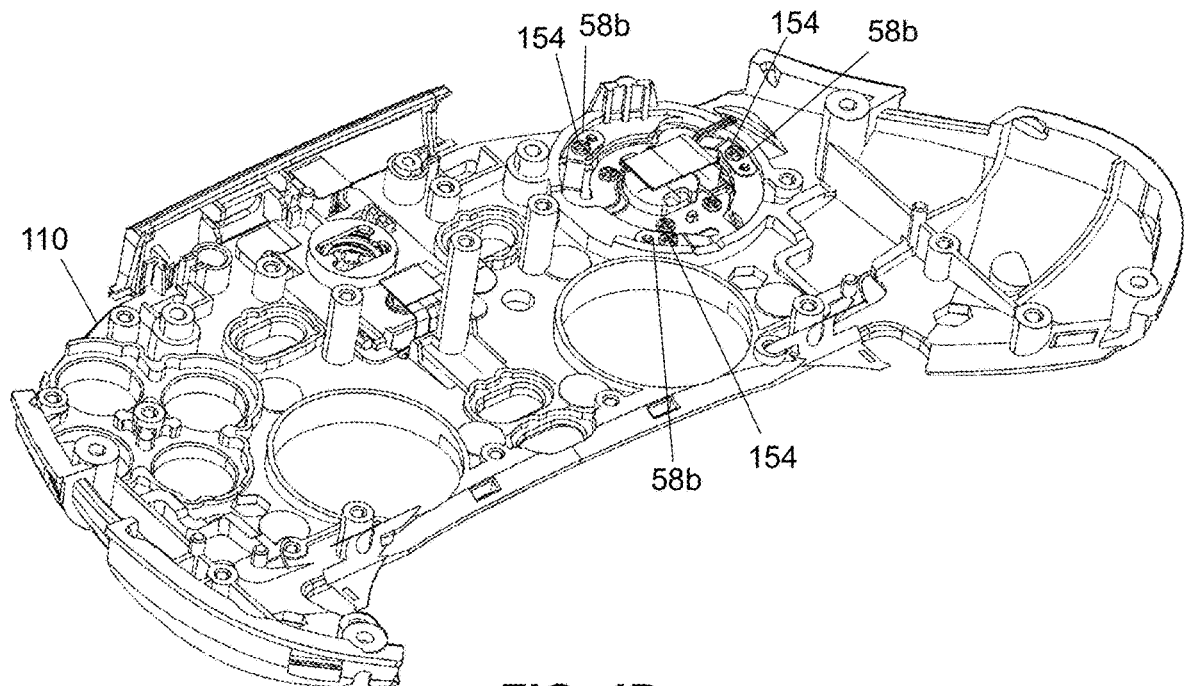
FIG. 4D illustrates the arms of the suspension system being fixed to the shelves of the controller body.

The inserted directional pad can then be rotated such that the segment of each of the arms that includes the second end is disposed on a respective one of the shelves of the portion of the body and the shell is disposed between the shell and the segment (FIG. 4C). With the segments of the arms that include the arms' second ends disposed on the shelves, the segment of each of the arms can be fixed to the shelf that the segment is disposed on, such as with one or more fasteners (e.g., 154) like one or more screws (FIG. 4D).

This method of assembly can minimize or avoid compression of the arms when the directional pad is coupled to the controller body, and may be particularly well-suited when the directional pad includes arms that each extend along a downward and angular path to permit the downward-and-rotational movement of the shell that enhances the haptic feedback of the directional pad's haptic actuator (e.g., 62).

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the products, systems, and methods are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A directional pad for a controller, the directional pad comprising:
    a shell that includes a top that has opposing upper and lower surfaces;
    a suspension system that:
        is coupled to the shell; and
        includes three or more elastic arms, wherein each of the arms extends between a first end that is coupled to the shell and a second end that is disposed lower than the shell and the first end of the arm; and
    a haptic actuator that is configured to vibrate the shell.

2. The directional pad of claim 1, wherein in a planform of the suspension system, for each of the arms, an angular separation, taken about a center of the planform of the suspension system, between the first and second ends is at least 10°.

3. The directional pad of claim 2, wherein, for each of the arms, the angular separation between the first and second ends is at least 30°.

4. The directional pad of claim 2, wherein in the planform of the suspension system and as taken about a center of the planform of the suspension system, for each of the arms, an angular separation between the second end of the arm and the second end of a first angularly adjacent one of the arms is approximately the same as an angular separation between the second end of the arm and the second end of a second angularly adjacent one of the arms.

5. The directional pad of claim 2, wherein each of the arms:
    has opposing upper and lower surfaces and an edge connecting the upper surface to the lower surface;
    wherein a first segment of the arm includes:
        the first end; and
        a first portion of the edge that subtends an angle that is greater than or equal to 90°.

6. The directional pad of claim 5, wherein for each of the arms:
    the first segment of the arm is disposed on the shell;
    a second segment of the arm includes the second end of the arm and is disposed lower than the first segment of the arm; and
    a third segment of the arm extends from the first segment to the second segment.

7. The directional pad of claim 6, wherein for each of the arms:
    the second segment of the arm includes a second portion of the edge; and
    the third segment of the arm includes a third portion of the edge that extends from the first portion of the edge to the second portion of the edge and is linear.

8. The directional pad of claim 1, comprising a capacitive touch sensor that is configured to measure a position at which an electrically-conductive object touches the upper surface of the top of the shell.

9. The directional pad of claim 1, wherein the haptic actuator comprises a linear resonant actuator configured to vibrate the upper surface of the top of the shell in a direction that is substantially parallel with a vertical axis that extends through the upper surface of the top of the shell.

10. The directional pad of claim 1, wherein the upper surface of the top of the shell has a circular planform.

11. A controller comprising:
    a body;
    a plurality of buttons coupled to the body; and
    a directional pad comprising:
        a shell that includes a top that has opposing upper and lower surfaces;
        a suspension system that:
            is coupled to the shell; and
            includes three or more elastic arms, wherein each of the arms extends between a first end that is coupled to the shell and a second end that is coupled to the body of the controller and is disposed lower than the shell and the first end of the arm; and
        a haptic actuator that is configured to vibrate the shell;
    wherein the shell is movable relative to the body between first and second positions and the shell is lower when the shell is in the second position than when the shell is in the first position.

12. The controller of claim 11, wherein for each of the arms, a difference between a height of the first end of the arm and a height of the second end of the arm when the shell is in the first position is within 5% of a difference between the height of the first end of the arm and the height of the second end of the arm when the arms are in a resting position.

13. The controller of claim 11, wherein a force the arms exert on the shell when the shell is in the first position is less than or approximately equal to a weight of the directional pad.

14. The controller of claim 11, wherein:
    the shell of the directional pad is disposed in an opening of the body;
    the body includes, for each of the arms of the suspension system, a shelf disposed at a periphery of the opening; and
    the second end of each of the arms is coupled to a respective one of the shelves of the body such that the shelf is disposed between the second end of the arm and the shell.

15. The controller of claim 14, wherein in a planform of the suspension system, for each of the arms:
    an angular separation, taken about a center of the planform of the suspension system, between the first and second ends is at least 30°; and
    as taken about a center of the planform of the suspension system, an angular separation between the second end of the arm and the second end of a first angularly adjacent one of the arms is approximately the same as an angular separation between the second end of the arm and the second end of a second angularly adjacent one of the arms.

16. The controller of claim 15, wherein each of the arms:
    has opposing upper and lower surfaces and an edge connecting the upper surface to the lower surface;
    wherein a first segment of the arm includes:
        the first end; and
        a first portion of the edge that subtends an angle that is greater than or equal to 90°.

17. The controller of claim 11, comprising a capacitive touch sensor is configured to measure a position at which an electrically-conductive object touches the upper surface of the top of the shell.

18. The controller of claim 11, wherein the haptic actuator comprises a linear resonant actuator configured to vibrate the upper surface of the top of the shell in a direction that is substantially parallel with a vertical axis extending through the upper surface of the top of the shell.

19. The controller of claim 11, comprising two thumbsticks, wherein:
the body has a main portion disposed between first and second gripping portions, each of the gripping portions projecting rearwardly away from the main portion;
the directional pad is disposed:
closer to the first gripping portion than to the second gripping portion; and
closer to a front of the body than to a rearmost point of the first gripping portion;
the buttons include four buttons that are each disposed:
closer to the second gripping portion than to the first gripping portion; and
closer to the front of the body than to a rearmost point of the second gripping portion; and
each of the thumbsticks is:
coupled to the main portion of the body; and
disposed closer to a rear of the main portion of the body than to the front of the body.

20. A method of making a controller, the method comprising:
inserting a directional pad into an opening of a portion of a body of the controller, wherein:
the directional pad comprises:
a shell that includes a top that has opposing upper and lower surfaces;
a suspension system that:
is coupled to the shell; and
includes three or more elastic arms, wherein each of the arms extends between a first end that is coupled to the shell and a second end that is disposed further from the shell than is the first end; and
a haptic actuator that is configured to vibrate the shell;
the portion of the body of the controller comprises, for each of the arms of the suspension system, a shelf at a periphery of the opening and a space angularly disposed between two of the shelves; and
the inserting is performed such that a segment of each of the arms that includes the second end of the arm passes through a respective one of the spaces;
rotating the inserted directional pad such that the segment of each of the arms is disposed on a respective one of the shelves and the shelf is disposed between the shell and the segment; and
fixing the segment of each of the arms to the shelf that the segment is disposed on.

* * * * *